Sept. 8, 1959 W. R. FREEMAN 2,903,100
RATIO CHANGER
Filed June 6, 1955 2 Sheets-Sheet 1

INVENTOR
WALTER R. FREEMAN
By Gravely, Lieder, Woodruff & Wills
ATTORNEYS

Sept. 8, 1959 W. R. FREEMAN 2,903,100
RATIO CHANGER
Filed June 6, 1955 2 Sheets-Sheet 2

PRESSURE DEVELOPED BY MASTER CYLINDER

INVENTOR:
WALTER R. FREEMAN
By Gravely, Lieder, Woodruff & Wills
ATTORNEYS

2,903,100

RATIO CHANGER

Walter R. Freeman, Portage Des Sioux, Mo., assignor to Wagner Electric Corporation, St. Louis, Mo., a corporation of Delaware Application June 6, 1955, Serial No. 513,331

1 Claim. (Cl. 188—152)

This invention relates generally to hydraulic braking apparatus and more particularly to a novel ratio changer for automatically providing a predetermined pressure ratio between the front and rear wheel brakes during a braking application.

It is an object of this invention to provide a ratio changer which is electrically operative at a predetermined time during a braking application to prevent full braking forces on either the front or rear wheel brake assemblies thereby facilitating easier control of the vehicle.

Another object of the invention is to provide a ratio changer for providing a predetermined differential between the pressure applied in one set of brakes and the pressure applied in another set of brakes.

Another object is to provide a ratio changer for automatically providing and maintaining a ratio between the actuating pressures applied to the front and rear brake assemblies, and means for disabling the ratio changer so that full and equal braking pressures may be exerted in all of the brake assemblies.

These and other objects and advantages will become apparent hereinafter.

Briefly, the invention comprises a ratio changer positioned in the pressure line between the master cylinder and one set of brake assemblies, the ratio changer having an inlet and an outlet with a by-pass passageway therebetween, valve means adjacent to the by-pass passageway, a two-step piston having one end in communication with the inlet and the other end in communication with the outlet, a cavity intermediate the piston and the outlet into which the piston is adapted to reciprocate, and electrical means adapted to move the valve means into sealing contact with the by-pass passageway at a predetermined time.

The invention also consists in the parts and in the combinations and arrangements of parts hereinafter described and claimed.

Figure 1:
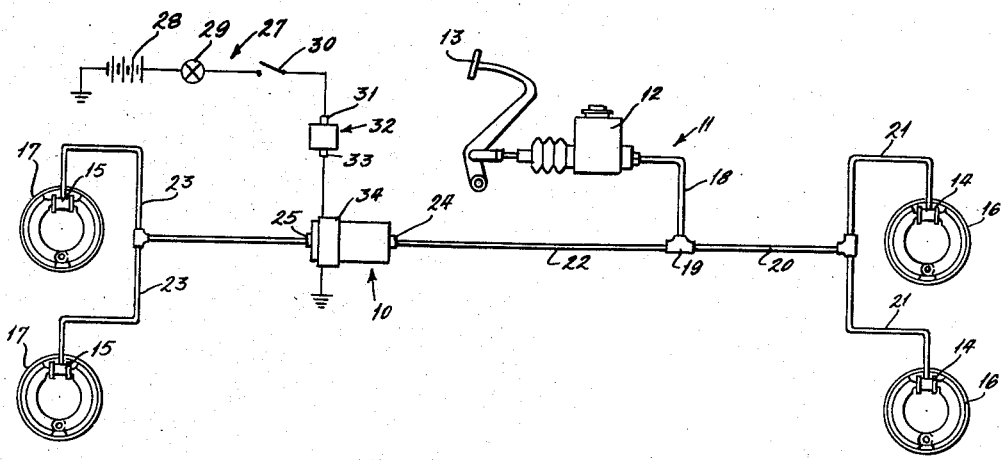
Figure 2:
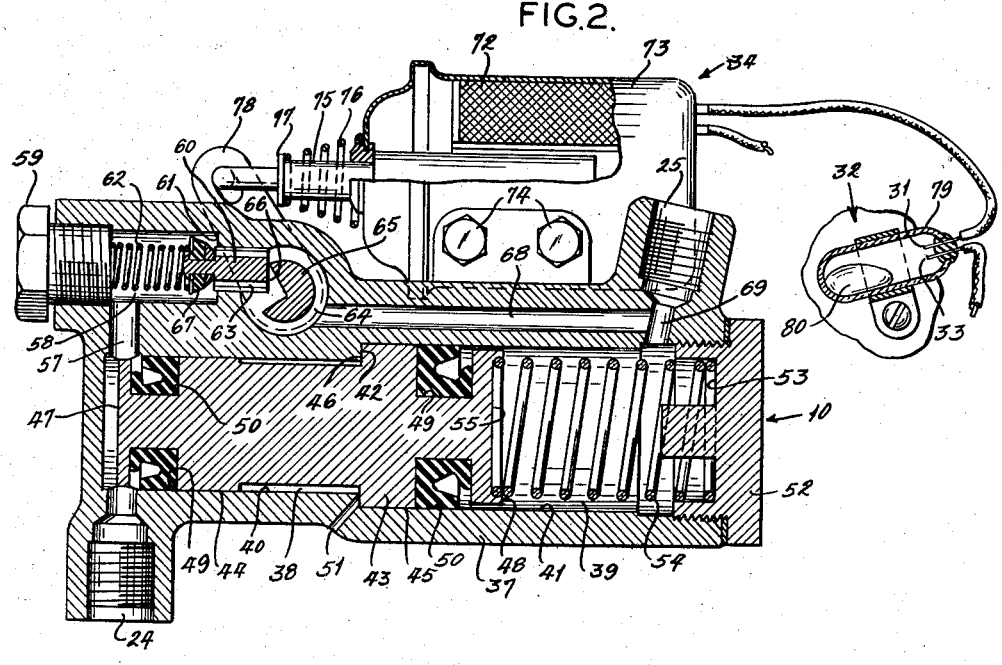
Figure 3:
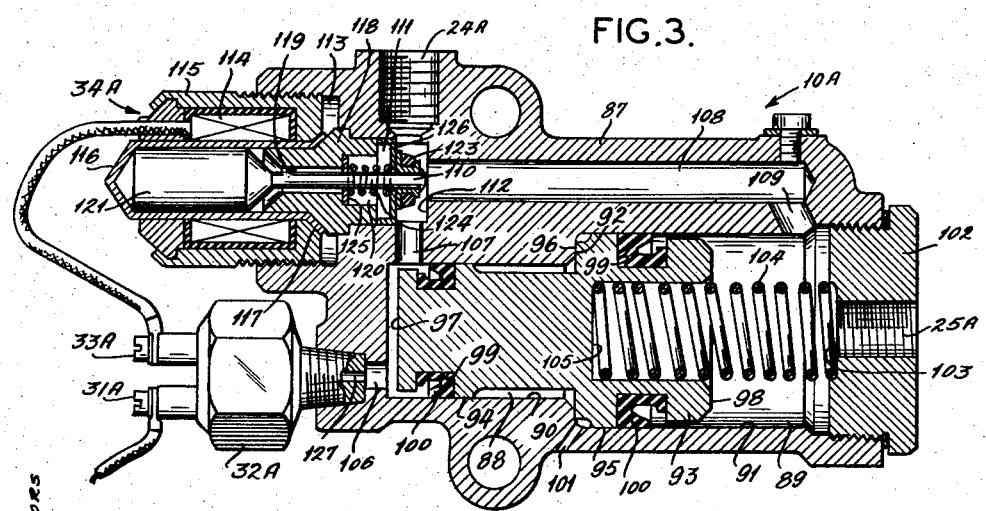
Figure 4:
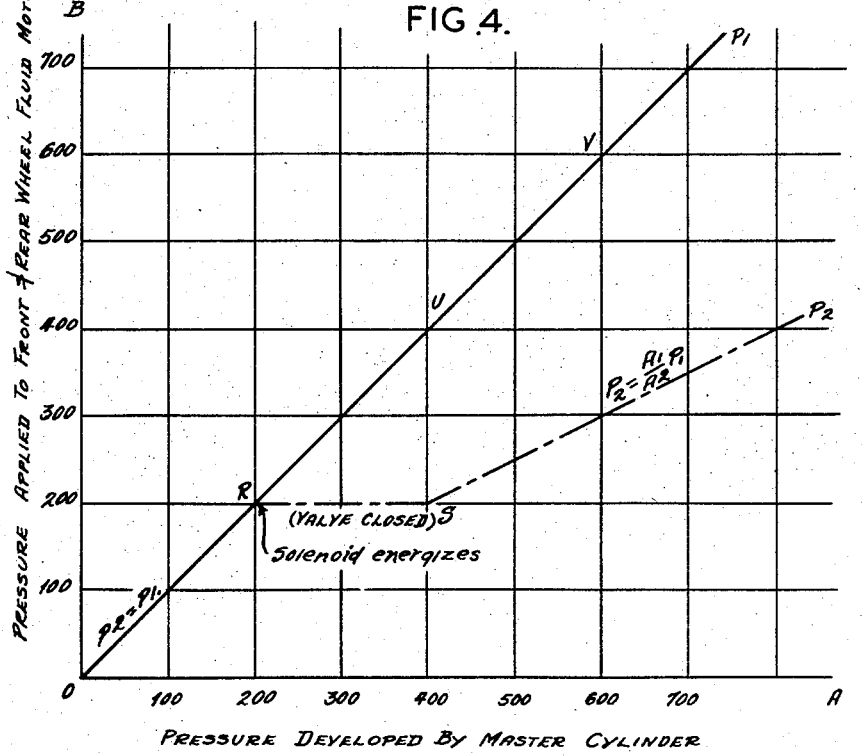

In the accompanying drawings which form a part of this specification and wherein like numerals refer to like parts wherever they occur:

Fig. 1 is a diagrammatic view of a hydraulic brake system including a ratio changer constructed in accordance with the teachings of the present invention, Fig. 2 is a longitudinal sectional view of one embodiment of the ratio changer showing its parts in inoperative position, Fig. 3 is a view similar to Fig. 2 showing another embodiment of the ratio changer, and Fig. 4 is a graphic representation of the ratio of the fluid pressure applied to different sets of brake assemblies as effected by the operation of the ratio changer.

Referring to Fig. 1 of the drawings, a ratio changer 10 embodying the teachings of the present invention is shown positioned in a hydraulic brake system 11 of a motor vehicle. The brake system 11 includes a master cylinder 12 operated by a foot pedal 13 to develop fluid pressure in fluid motors 14 and 15 of the front and rear wheel brake assemblies 16 and 17, respectively. An outlet conduit 18 is connected between the outlet of the master cylinder 12 and a T 19, a conduit 20 connects one outlet of the T 19 to branch conduits 21 leading to the fluid motors 14 in the front wheel brake assemblies 16 and another conduit 22 connects the other outlet of the T 19 to branch conduits 23 leading to the fluid motors 15 in the rear wheel brake assemblies 17. The ratio changer 10 is provided with an inlet 24 and an outlet 25 and is shown interposed in the conduit 22 to the rear wheel brake assemblies 17 for passenger car use. However, if the ratio changer is to be installed in a tractor-trailer train, it may be positioned in the conduit 20 to the front wheel brake assemblies, as will be described more fully hereinafter. When the foot pedal 13 is depressed to effect a braking application, the master cylinder 12 forces fluid under pressure through the conduits 18, 20 and 21 to the front wheel brake assemblies 16, and through the conduits 18, 22 and 23 and the ratio changer 10 to the rear wheel brake assemblies 17.

An electrical circuit 27 for controlling the operation of the ratio changer 10 comprises a battery 28 having its negative terminal connected to ground and its positive terminal connected through an ignition switch 29 to one side of a manually operated master switch 30. The other side of the master switch 30 is connected to one terminal 31 of a solenoid control switch 32, which is responsive to the initial braking effort during a braking application when the master switch 30 is closed. The other terminal 33 of the solenoid control switch 32 is connected to one side of a solenoid 34 in the ratio changer 10, the other side of the solenoid 34 being connected to ground whereby the electrical circuit 27 will be completed and the solenoid 34 operative when all of the switches are closed. During fair weather conditions, the ratio changer 10 may be disabled or rendered inoperative by opening the master switch 30, which is positioned in an accessible place on the dashboard of the vehicle. When the ratio changer 10 is inoperative, equal fluid pressure will be exerted on the fluid motors 14 and 15 of the front and rear wheel brake assemblies 16 and 17, a by-pass passageway being provided in the ratio changer 10 between the inlet 24 and the outlet 25 to permit the flow of brake fluid therethrough. However, when inclement weather conditions make the roads wet or slippery, the ratio changer 10 may be conditioned for operation by closing the master switch 30 so that a reduced fluid pressure will be exerted in the fluid motors 15 in the rear wheel brake assemblies 17 during a braking application to prevent the rear wheels of the passenger car from skidding.

Referring to Fig. 2, one embodiment of the ratio changer 10 comprises a valve body or casing 37 having a bore 38 and a counterbore 39 forming a double-diametral piston chamber, which is defined by bore and counterbore walls 40 and 41 and a radial shoulder or wall 42 formed therebetween. A two-step piston 43 is positioned in the chamber and has a small diametral portion 44 in sliding contact with the bore wall 40 and a large diametral portion 45 in sliding contact with the counterbore wall 41. A radial shoulder 46 is formed on the piston 43 between the small and large portions 44 and 45 for abutment against the radial shoulder 42 in the chamber. The piston 43 also has a small end 47 and a large end 48 with annular apertures 49 adjacent thereto in which resilient annular sealing cups 50 are positioned for sealing engagement with the bore and counterbore walls 40 and 41. The area of the small and large ends 47 and 48 of the piston 43 will be referred to as $A_1$ and $A_2$ in description of the operation of the ratio changer 10. Inasmuch as a sealed condition exists between the bore and counterbore walls 40 and 41 and the piston 43 intermediate the sealing cups 50, reciprocation of the piston 43 to the right or away from the radial wall 42 would be restricted by the partial vacuum developed between the radial walls 42 and 46 of the casing 37 and piston 43, respectively. Accordingly, a small port 51 is formed in the casing 37 extending from its outer periphery to the radial shoulder 42 of the casing 37 so that any resistance to the movement of the piston 43 will be overcome by the admission and expulsion of air. The right end of the counterbore wall 41 is tapped to threadedly receive an end plug 52 having an interior annular groove 53 for seating one end of a spring 54. The other end of the spring 54 is positioned in a circular depression 55 in the large end 45 of the piston 43, whereby the piston 43 is normally biased to the left so that its radial shoulder 46 is abutting the radial shoulder 42 of the casing 37.

The casing 37 is also provided with a vertical passage 57 in communication with the bore 38 having the small end 47 of the piston 43 positioned therein, the passage 57 extending from the inlet 24 to a valve chamber 58 formed in the upper portion of the casing 37. The valve chamber 58 is enclosed by a closing plug 59 and houses a by-pass valve member 60, which is biased toward its valve seat 61 by a valve spring 62. The valve member 60 extends into a bore 63 connecting the valve chamber 58 with a transverse bore 64 formed in the casing 37. A cam 65 is pivotally positioned in the transverse bore 64 for engagement with an end 66 of the by-pass valve 60 extending into transverse bore 64. When the solenoid 34 is un-energized and the ratio changer is inoperative, the cam 65 is pivoted counterclockwise to contact the end 66 of the by-pass valve 60 and prevent a sealing gasket 67 provided on the left end of the valve 60 from contacting the valve seat 61. A longitudinal horizontal passage 68 extends from the transverse bore 64 to an opening 69, which connects the outlet 25 with the counterbore 39 to the right of the piston 43 so that its reciprocation will not cause the opening 69 to be closed. It is now apparent that the by-pass passageway provided to permit the flow of brake fluid through the ratio changer 10 from the inlet 24 to the outlet 25 includes the vertical passage 57, the valve chamber 58, the bore 63, the transverse bore 64, the horizontal passage 68, and the opening 69.

As further shown in Fig. 2, the solenoid 34 includes a solenoid coil 72 enclosed by a frame 73 rigidly secured to the casing 37 in any suitable manner, such as by bolts 74. An armature or plunger 75 is positioned in the coil 72 for reciprocation therein, the armature 75 being biased to the left by a return spring 76 extending between the frame 73 and a stop washer 77 when the solenoid coil 72 is un-energized. The left end of the armature 75 is pivotally connected to one end of a lever arm 78, which has its other end rigidly secured to the cam 65. The return spring 76 provides the force for maintaining the cam 65 in counterclockwise position when the solenoid coil 72 is un-energized, the force of return spring 76 being stronger than the force of valve spring 62 so that the by-pass valve 60 will only seat on the abutment surface 61 when the solenoid coil 72 is energized and the armature is moved to the right therein.

The solenoid control switch 32 for energizing the solenoid coil 72 and causing the ratio changer 10 to become operative is shown to be an inertia type switch in Fig. 2. The switch 32 includes a longitudinal casing 79 having a globule of mercury 80 or other current carrying material positioned therein. The casing 79 is mounted in any suitable place in the vehicle and is adjusted at a predetermined angle so that the terminals 31 and 33 will project into the casing 79 at the upper end thereof. The angle at which the casing 79 is positioned will determine the rate of deceleration needed to cause the mercury 80 to move upwardly into contact with the terminals 31 and 33 so as to close the electrical circuit 27 and energize the solenoid coil 72.

It is now apparent that as long as the solenoid coil 72 is un-energized, the ratio changer 10 will be inoperative and a braking application will cause fluid from the master cylinder 12 to flow through the by-pass passage of the ratio changer 10 so that equal pressures will initially be built up in the fluid motors 14 and 15 of the front and rear wheel brake assemblies 16 and 17. This initial braking effort will result in the deceleration of the passenger car, the inertia incident to a predetermined rate of deceleration being effective to move the mercury 80 into contact with the terminals 31 and 32 of the solenoid control switch 32 so that the electrical circuit 27 will be completed when the master switch 30 is closed. The solenoid coil 72 is thus energized and the ratio changer 10 becomes operative to provide a ratio between the brake pressures thereafter applied in the front and rear wheel brake assemblies 16 and 17, as will now be described.

Upon the energization of the solenoid coil 72, the armature 75 is moved to the right into centered position in the solenoid coil 72 against the restraining action of the spring 76 thereby moving the lever arm 78 and causing the cam 65 to pivot in a clockwise direction. The cam 65 is thus moved out of contact with the right end 66 of the by-pass valve 60, which will be moved onto its seat 61 by the valve spring 62. Therefore, the gasket 67 is positioned on the seat 61 so that the bore 63 is sealed from the valve chamber 58 and normal flow of brake fluid through the by-pass passage is prevented.

At the instant the solenoid coil 72 is energized and the valve 60 is seated, the fluid pressure on the small end 47 of the piston 43, hereinafter referred to as $P_1$ acting on $A_1$, is equal to the fluid pressure on the large end 48 of the piston 43, hereinafter referred to as $P_2$ acting on $A_2$. Inasmuch as $A_2$ represents a surface area that is proportionately larger than the surface area represented by $A_1$, the effective force on the large end 48 will be greater than the effective force on the small end 47 of the piston 43. Therefore, assuming that the surface area $A_2$ is twice as large as the surface area $A_1$, the piston 43 is restrained from rightward movement by a force on its large end 48 equal to twice the force on its small end 47 (assuming the pressure exerted by the spring 54 is negligible). Furthermore, an increase in the value of $P_1$ will not be effective to move the piston 43 until a pressure ratio is established between $P_1$ and $P_2$, which is the reciprocal of the $A_1$ to $A_2$ ratio.

As the operator further depresses the foot pedal 13 during a braking application, the pressure developed by the master cylinder 12 will be exerted in the fluid motors 14 of the front wheel brake assemblies 16 and on the small end 47 of the piston 43, it being apparent that the pressure $P_1$ is always equal to the pressure developed by the master cylinder 12. Inasmuch as the valve 60 prevents the passage of fluid to the rear wheel brake assemblies 17 and to the large end 48 of the piston 43, the pressure $P_2$ remains at a constant value after the valve 60 has been seated until the forces effective on opposite ends of the piston 43 are equal. This is represented best by the formula: $P_1 A_1 = P_2 A_2$. Accordingly, the value of pressure $P_1$ will have to increase to twice the value of pressure $P_2$, if $A_2$ is twice the area of $A_1$.

It is now apparent that when the forces effective on the opposite ends of the piston 43 have become equalized, a further increase in the value of pressure $P_1$, will cause the piston 43 to reciprocate to the right thereby increasing the value of pressure $P_2$. However, the increase in $P_1$ will always be twice as large as the increase in $P_2$ inasmuch as the area $A_1$ acted on by $P_1$ is half as large as the area $A_2$ acted on by $P_2$, the value of $P_2$ at any given moment being found by the formula:

$$P_2 = \frac{A_1 P_1}{A_2}$$

Therefore, it is obvious that once the value of $P_1$ has increased to twice the value of $P_2$, this ratio will remain constant throughout the braking application so that twice as much fluid pressure will be exerted in the front wheel brake assemblies 16 as in the rear wheel brake assemblies 17.

The operation of the ratio changer 10 is illustrated graphically in Fig. 4 wherein the abscissa OA refers to the pressure developed by the master cylinder 12 and the ordinate OB refers to the pressure applied to the front and rear wheel brake assemblies 16 and 17, the solid graph line referring to the pressure $P_1$ applied in the front wheel brake assemblies 16 and the broken graph line referring to the pressure $P_2$ applied in the rear wheel brake assemblies 17 following the energization of the solenoid coil 72. As shown by the curve OR, the pressure initially developed by the master cylinder 12 is applied equally to the front and rear wheel brake assemblies 16 and 17 (as represented by $P_1$ and $P_2$, respectively). When the initial braking effort is sufficient to cause the solenoid control switch 32 to become closed incident to the deceleration of the passenger car, the solenoid coil 72 is energized and the valve 60 seated, which occurs at point R on the graph for the purpose of disclosure. Thereafter, $P_1$ continues to equal the pressure developed by the master cylinder 12 as shown by curve RUV, whereas $P_2$ will remain constant from R to S at which time the value of $P_1$ (at point U) is equal to twice the value of $P_2$ (at point S) and the piston 43 will have equal effective forces applied to its opposite ends. Curve ST shows that the increase rate of the pressure $P_2$ is one-half the increase rate of the pressure $P_1$, as shown by curve UV. It is also apparent that the force of the spring 54 will be added to the $P_2A_2$ force whereby $P_1$ must increase to a slightly larger value before the piston 43 will move to the right.

When a braking application has been completed or the rate of deceleration decreases to a predetermined value, the mercury 80 in the solenoid control switch 32 will move out of contact with the terminals 31 and 33 and the electrical circuit will become opened. Although the solenoid coil 72 is thus de-energized, the valve 60 will remain seated on the abutment 61 by the pressure $P_1$ in the valve chamber 58 until sufficient fluid returns to the master cylinder 12 so that the pressure $P_1$ together with the force of the valve spring 62 is overcome by the force of the return spring 76 rotating the cam 65 counterclockwise against the right end 66 of the valve 60. Therefore, if the electrical circuit 27 should become broken and the solenoid coil 72 de-energized during a braking application, the operation of the ratio changer 10 will not be effected once the valve 60 has become seated.

As the fluid returns to the master cylinder 12 and the value of pressure $P_1$ is reduced on the small end 47 of the piston 43, the pressure $P_2$ acting on the large end 48 will cause the piston 43 to move to the left until the radial shoulder 42 and 46 of the casing 37 and piston 43 are in abutting relationship. When the pressure $P_1$ has decreased sufficiently to permit the cam 65 to move the valve 60 off its seat 61, the pressure $P_2$ will flow back to the master cylinder 12 through the by-pass passageway.

Referring to Fig. 3, another embodiment A of the invention is illustrated, the ratio changer 10A comprising a casing 87 having a bore 88 and a counterbore 89 forming a double-diametral piston chamber, which is defined by bore and counterbore walls 90 and 91, respectively, and a radial shoulder or wall 92 therebetween. A two-step piston 93 is reciprocably positioned in the chamber and has a small diametral portion 94 in sliding contact with the bore wall 90 and a large diametral portion 95 in sliding contact with the counterbore wall 91. A radial shoulder 96 is formed on the piston 93 between the small and large portions 94 and 95 for abutment against the radial shoulder 92 in the chamber. The piston also has a small end 97 and a large end 98 with annular apertures 99 adjacent thereto in which resilient annular sealing cups 100 are positioned for sealing engagement with the bore and counterbore walls 90 and 91. The areas of the small and large ends 97 and 98 of the piston 93 will be referred to as area $A_1$ and area $A_2$, respectively in the description of the operation of ratio changer 10A. A small port 101 is also formed in the casing 87 extending from its outer periphery to the radial shoulder 92 to overcome any resistance to the movement of piston 93 to the right in the counterbore 89. The right-hand end of the counterbore wall 91 is tapped to receive an end plug 102 having the outlet 25A formed therein, an annular groove 103 being formed about the outlet 25A in which one end of a spring 104 is seated. The other end of the spring 104 is positioned in a circular depression 105 in the large end 98 of the piston 93, whereby the piston 93 is normally biased to the left so that its radial shoulder 96 is abutting the radial shoulder 92 of the casing 87.

The casing 87 is also provided with an opening 106 in communication with the bore 88 to the left of the piston 93, the solenoid control switch 32A being positioned in the opening 106, as will be described hereinafter. A vertical passage 107 is formed in the casing 87 extending from the inlet 24A into communication with the bore 88 providing fluid communication to the small end 97 of the piston 93. A longitudinal horizontal passage 108 extends from the vertical passage 107 to a point in the casing 87 adjacent to the right-hand end of the counterbore 89 to which the horizontal passage 108 is connected by an opening 109, which is formed to the right of the piston 93 so that its reciprocation will not cause the opening 109 to be closed. It is now apparent that when fluid is forced into the ratio changer 10A through the inlet 24A, that equal pressures are built up on the opposite ends of the piston 93 as long as the vertical and horizontal passages 107 and 108 remain open. However, a by-pass valve member 110 is provided to seal the horizontal passage 108 during the operation of the ratio changer 10A, the valve 110 being housed in a valve chamber 111 in communication with the horizontal passage 108 and providing a radial abutment or seat 112 therebetween. A counterbore 113 is provided in the outer wall of the casing 87 in communication with the valve chamber 111, the counterbore 113 being tapped to threadly receive the solenoid 34A which encloses the counterbore 113 and valve chamber 111 and provides the means for moving the valve 110 onto the valve seat 112.

The solenoid 34A comprises a solenoid coil 114 enclosed by a frame 115, which is threaded for securing the solenoid 34A in the counterbore 113 of the casing 87. A non-magnetic plunger guide 116 extends into the solenoid coil 114 and has its inner end 117 flared outwardly for sealing contact between cooperating faces of the frame 115 and a stationary core 118 positioned within the plunger guide 116. The stationary core 118 is provided with a bore 119 extending through its center and a counterbore 120 in its right end, the counterbore 120 forming a portion of the valve chamber 111. An armature 121 is slidably positioned in the plunger guide 116 and carries the by-pass valve member 110 on its right-hand end. The valve 110 extends through the bore and counterbore 119 and 120 of the stationary core 118 and has a sealing gasket 123 on its right end, the gasket 123 being positioned adjacent to the valve seat 112 and adapted to move into sealed contact therewith when the solenoid coil 114 is energized. However, when the solenoid coil is un-energized, the by-pass valve 110 and armature 121 are biased to the left by a valve spring 124, which extends between a stop washer 125 secured to the by-pass valve 110 and a ring 126. The ring 126 is secured to the wall of the valve chamber 111 and has a central aperture through which the by-pass valve 110 extends.

The solenoid control switch 32A for energizing the solenoid coil 114 and moving the by-pass valve 110 into sealing contact with its seat 112 comprises a conventional pressure switch wherein brake fluid enters the switch through port 127 and moves a flexible diaphragm or the like (not shown) into contact with the terminals 31A and 33A. It is apparent that with the pressure switch 32A positioned in the opening 106, an initial braking application will cause fluid from the master cylinder 12 to enter the inlet 24A and build up equal pressures in the bore and counterbore 88 and 89 until sufficient pressure is developed to flex the diaphragm in the pressure switch 32A. The electrical circuit 27 is thus completed when the master switch 30 is closed, and the solenoid coil 114 is energized so that the ratio changer 10A is operative to provide a differential in brake pressures being applied to the fluid motors 14 and 15 in the front and rear brake assemblies 16 and 17.

The operation of the ratio changer 10A is basically the same as the ratio changer 10, described herinabove. The valve 110 becomes seated upon the energization of the solenoid coil 114 whereby the horizontal passage 108 is blocked. The pressure $P_2$ exerted on the surface area $A_2$ of the piston 93 remains constant, whereas the pressure $P_1$ exerted on the surface area $A_1$ of the piston 93 continues to increase as the foot pedal 13 is depressed until sufficient pressure is developed in the bore 88 to equal the effective pressure in the counterbore 89. If the area ratio of $A_1$ to $A_2$ is 1 to 2, the pressure $P_1$ will have to increase to twice the value of $P_2$, and thereafter the piston 93 will reciprocate to the right with an additional increase in pressure $P_1$ in order to maintain the effective pressures on its opposite ends in equilibrium.

Although the ratio changer 10 has been shown and described as positioned in the conduit 22 to the fluid motors 15 for the rear wheel brake assemblies 17 in order to prevent the skidding of the rear wheels of passenger cars, it is to be understood that the ratio changer 10 may be positioned in the conduit 20 to the fluid motors 14 for the front wheel brake assemblies 16 of tractor-trailer trains. Inasmuch as there is no appreciable weight shift to the front wheels of the tractor during a braking application, better steering control results from positioning the ratio changer 10 between the master cylinder 12 and the front wheel brake assemblies 16 as just described.

It is now apparent that the embodiments of the invention herein disclosed are operative at predetermined times in a braking application to control the increase of pressure in either the front or rear wheel fluid motors 14 or 15 so that the increase of pressure in the uncontrolled fluid motors will be in a predetermined ratio thereto. Furthermore, the shift of weight which takes place during a braking application in a passenger car is exemplified by the movement of the mercury 80 in the inertia switch 32. Accordingly, by using an inertia switch on a passenger car, the solenoid 34 will be energized and the pressure in the rear wheel brake assemblies 17 held constant at the moment the weight is shifted from the rear wheels and their traction is reduced. On the other hand, the pressure switch 32A is preferred for truck use, since normal braking pressures are applied in the rear wheel brake assemblies 17 and a predetermined optimum pressure value for the front wheel brake assemblies 16 can be provided.

The embodiments of the invention herein chosen for the purposes of disclosure are intended to cover all changes that do not constitute departures from the spirit and scope of the invention.

What I claim is:

A ratio changing device adapted to be connected in a conduit to one set of front and rear sets of fluid motors in a hydraulic brake system of a vehicle and to be selectively conditioned for operation during a braking application to provide braking pressures in the one set of fluid motors substantially equal to the braking pressures in the other set of fluid motors until the vehicle decelerates at a preselected rate, to maintain a fixed braking pressure in the one set of fluid motors during the remainder of the braking application unless the braking pressure in the other set of fluid motors is increased to a predetermined value substantially proportional to the braking pressure in the one set of fluid motors, and to maintain the proportion of the braking pressures in the sets of fluid motors at all times that the braking pressure in the other set of fluid motors is above the predetermined value; said ratio changing device comprising a casing having an inlet and an outlet, a piston chamber in said casing in communication with the inlet and outlet, an imperforate two-step piston having predetermined proportional small and large end areas, the piston being slidable in the piston chamber from an inoperative position toward the outlet and having its small and large end areas in communication with the inlet and outlet, respectively, a valve chamber in said casing in communication with said inlet and having an outlet opening, a valve element in said valve chamber and having a valve head with a sealing surface adapted to be seated in sealed position with said outlet opening and a fluid pressure responsive surface on the side opposite to said sealing surface, yieldable means biasing said valve element toward a sealed position with the outlet, a by-pass passage in said casing providing communication between said outlet opening and said outlet of said casing, a cam in said casing adapted to be moved between a valve element contacting position holding said sealing surface of said valve element in spaced fluid passing relation with the outlet opening against the biasing action of said yieldable means and a retracted position permitting said valve element to seat in sealed position with said outlet opening, compressible means biasing said cam toward valve element contacting position and having a force greater than the force exerted on said valve element by said yieldable means, and electro-responsive means adapted to move said cam to the retracted position to permit said valve element to seat, said electro-responsive means being adapted to be energized by inertia switch means adapted to be adjustably mounted on a vehicle to close in response to a predetermined rate of deceleration of the vehicle whereby the valve element is seated to close the by-pass passage so that communication between the inlet and outlet of the ratio changing device casing is interrupted.

References Cited in the file of this patent

UNITED STATES PATENTS

| | | |
|---|---|---|
| 1,490,300 | Wadsworth | Apr. 15, 1924 |
| 2,028,491 | Barrett et al. | Jan. 21, 1936 |
| 2,073,163 | Martin | Mar. 9, 1937 |
| 2,115,071 | Hunt | Apr. 26, 1938 |
| 2,181,717 | Wood et al. | Nov. 28, 1939 |
| 2,218,194 | Freeman | Oct. 15, 1940 |
| 2,219,765 | Chase | Oct. 29, 1940 |
| 2,313,232 | Freeman | Mar. 9, 1943 |
| 2,391,129 | Chambers | Dec. 18, 1945 |
| 2,751,575 | Jacobs et al. | June 19, 1956 |